(12) United States Patent
Baker

(10) Patent No.: US 7,817,431 B2
(45) Date of Patent: Oct. 19, 2010

(54) CHASSIS FOR AN ELECTRICAL COMPONENT

(75) Inventor: Alex Wade Baker, Ostrander, OH (US)

(73) Assignee: Honda Motor Co., Ltd., Tokyo (JP)

(*) Notice: Subject to any disclaimer, the term of this patent is extended or adjusted under 35 U.S.C. 154(b) by 162 days.

(21) Appl. No.: 12/110,577

(22) Filed: Apr. 28, 2008

(65) Prior Publication Data
US 2009/0268411 A1 Oct. 29, 2009

(51) Int. Cl.
*H05K 7/16* (2006.01)
(52) U.S. Cl. .......... 361/725; 361/679.33; 361/724; 361/752; 361/796; 248/27.1; 174/50
(58) Field of Classification Search ............ 361/679.01, 361/679.02, 679.31, 679.33, 679.4, 698, 361/704, 709, 724, 725, 727, 748, 752, 796
See application file for complete search history.

(56) References Cited

U.S. PATENT DOCUMENTS

| | | | |
|---|---|---|---|
| 4,699,341 A * | 10/1987 | Ponticelli ................. 248/27.1 |
| 5,307,327 A | 4/1994 | Green et al. |
| 5,491,614 A * | 2/1996 | Fowler et al. ............. 361/784 |
| 5,791,606 A * | 8/1998 | Blackburn ................ 248/27.1 |
| 6,652,777 B2 * | 11/2003 | Rapp et al. ................ 252/511 |
| 6,689,835 B2 | 2/2004 | Amarasekera et al. |
| 6,870,739 B2 | 3/2005 | Groos et al. |
| 2009/0154134 A1 * | 6/2009 | Hassler ..................... 361/818 |

* cited by examiner

*Primary Examiner*—Jayprakash N Gandhi
*Assistant Examiner*—Courtney Smith
(74) *Attorney, Agent, or Firm*—Plumsea Law Group, LLC

(57) ABSTRACT

A chassis configured to receive an electrical component for a motor vehicle is disclosed. The chassis includes an upper portion and a lower portion that releasably attach to a central portion using tabs. The chassis is constructed of a conductive plastic that facilitates RF shielding and sufficiently reduces the weight of the chassis.

25 Claims, 8 Drawing Sheets

CHASSIS FOR AN ELECTRICAL COMPONENT

BACKGROUND OF THE INVENTION

1. Field of the Invention

The present invention relates generally to motor vehicles and in particular to a chassis for protecting electrical components.

2. Description of Related Art

Mounting assemblies for audio components in an automobile have been previously proposed. Green (U.S. Pat. No. 5,307,327) teaches a mounting assembly for automotive audio components. In particular, Green teaches a housing and a cover configured to fit over an open end of the housing. The front cover is connected to the housing by means of an interference fit, in order to reduce rattling or buzzing sounds during vehicle operation. Additionally, Green teaches a housing including panels that are made of metal. Green teaches that the panels can be joined by means such as welding, tabs or screws to form the housing.

Groos et al. (U.S. Pat. No. 6,870,739) teaches a housing for electrical and mechanical components of an audio, video or navigational system in a motor vehicle. Groos teaches a housing that is collapsible. The housing includes closing elements that can be turned in place in order to lock the housing. Groos also teaches side walls of the housing that can be fastened to the housing walls by means of snap joints.

Amarasekera et al. (U.S. Pat. No. 6,689,835) teaches conductive plastic compositions and methods of manufacturing these compositions. Amarasekera teaches that the conductive plastic compositions may be used for housing electronic components and automotive exterior body panel applications.

The related art fails to teach or suggest the concept of using lightweight materials, instead of metal to form an electrical component chassis. In addition, the related art lacks provisions for providing easy assembly and access and to an interior portion of a chassis using simple mechanical connections. There is a need in the art for a solution to these problems.

SUMMARY OF THE INVENTION

The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUVs, motorcycles, scooters, boats, personal watercraft, and aircraft.

A chassis for an electrical component configured to be installed in a motor vehicle is disclosed. In one aspect, the invention provides a chassis for an electrical component configured to be installed in a motor vehicle, comprising: an integral central portion having side walls; an upper portion and a lower portion; the upper portion being associated with the central portion by the use of a first tab and a first tab receiving portion; the lower portion being associated with the central portion by the use of a second tab and a second tab receiving portion; and where the first tab receiving portion is substantially flexible and deflects when engaging the first tab and wherein the second tab receiving portion is substantially flexible and deflects when engaging the second tab.

In another aspect, the central portion includes a middle shelf portion.

In another aspect, the first tab associates with the first tab receiving portion in a direction perpendicular to the upper portion.

In another aspect, the second tab associates with the second tab receiving portion in a direction perpendicular to the lower portion.

In another aspect, the central portion, the upper portion and the lower portion are made of a conductive plastic.

In another aspect, the upper portion includes four tab receiving portions.

In another aspect, the lower portion includes four tab receiving portions.

In another aspect, the central portion includes eight tabs.

In another aspect, the invention provides a chassis for an electrical component configured to be installed in a motor vehicle, comprising: a central portion, a lower portion and an upper portion; the central portion, the lower portion and the upper portions being made of a conductive plastic; and where the upper portion and the lower portion are attached to the central portion by pressing the upper portion and the lower portion against the central portion in a direction perpendicular to the upper portion and the lower portion.

In another aspect, the central portion includes a first tab and the upper portion includes a first tab receiving portion and wherein the central portion includes a second tab and the lower portion includes a second tab receiving portion.

In another aspect, the conductive plastic provides flexibility for the first tab and the first tab receiving portion and for the second tab and the second tab receiving portion.

In another aspect, the conductive plastic provides RF shielding for the electrical component.

In another aspect, the chassis is configured to receive a printed circuit board.

In another aspect, the chassis is configured to receive an audio component.

In another aspect, the chassis is configured to receive a navigation system.

In another aspect, the central portion includes at least one cut out portion configured to receive a portion of an electrical component.

In another aspect, the lower portion includes at least one covering member that is configured to cover a portion of the cut out portion.

In another aspect, a first width of the covering member is larger than a second width of the cut out portion.

In another aspect, the lower portion includes a channel configured to receive the central portion and wherein the channel is configured to prevent gaps between the lower portion and the central portion.

In another aspect, the upper portion includes a channel configured to receive the central portion and wherein the channel is configured to prevent gaps between the lower portion and the central portion.

In another aspect, the invention provides a method of assembling a chassis for an electrical component configured to be installed in a motor vehicle, comprising the steps of: associating a central portion of the chassis with an upper portion of the chassis, the central portion being configured to receive an electrical component; pressing a tab receiving portion of the upper portion over a tab of the central portion; and connecting the upper portion to the central portion.

In another aspect, the tab receiving portion is substantially flexible.

In another aspect, the step of deflecting the substantially flexible tab receiving portion to engage the tab.

In another aspect, the central portion includes a middle shelf portion.

In another aspect, the step of attaching an electrical component to the middle shelf portion of the central portion.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
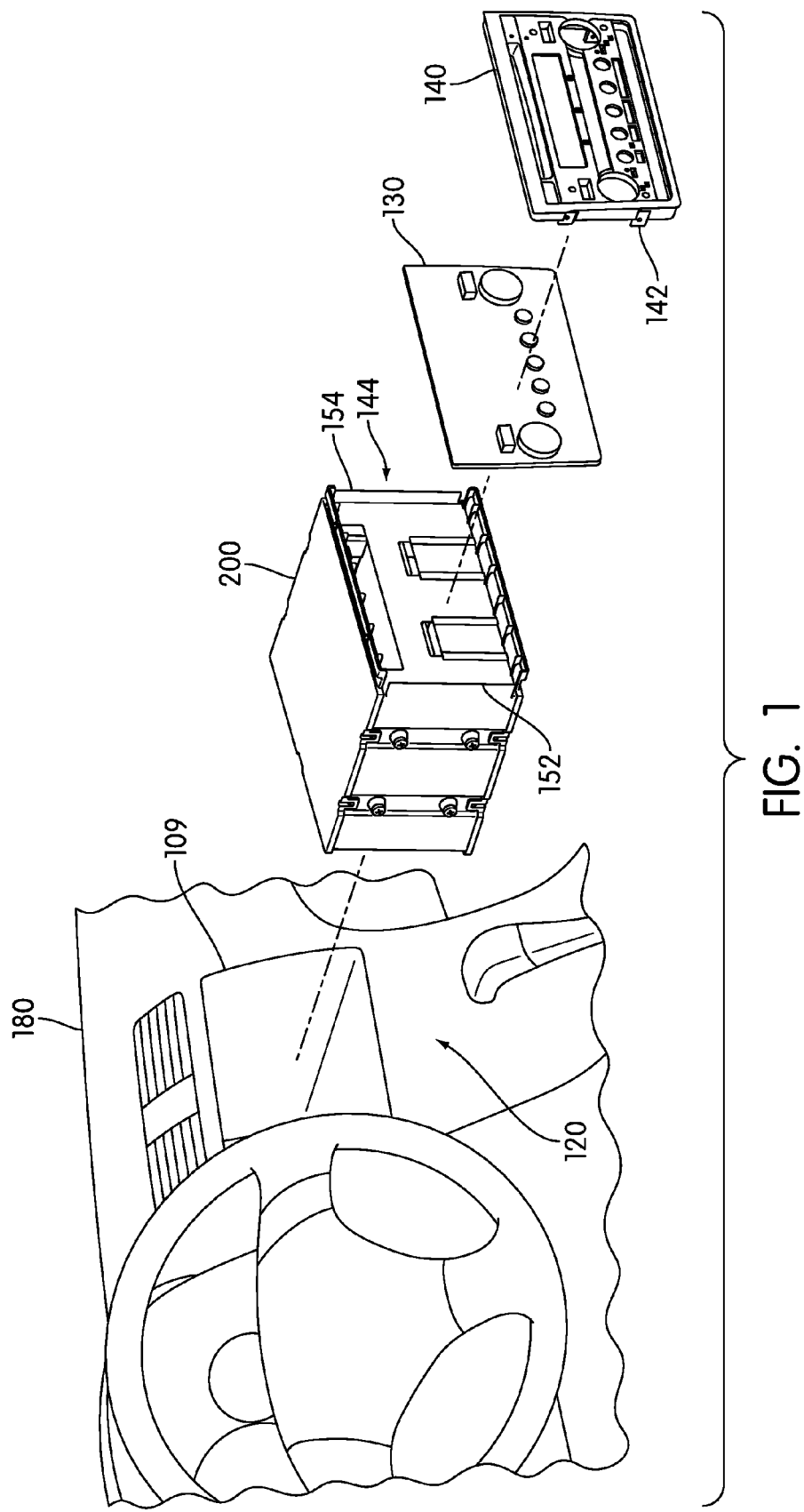
FIG. 1 is a schematic view of a preferred embodiment of a chassis with a front panel and face plate and a portion of an interior of a motor vehicle.

FIG. 1 illustrates a preferred embodiment of chassis 200. Chassis 200 is configured to be installed in the interior of motor vehicle 180. Motor vehicle 180 may be any type of car, truck or other kind of vehicle. In this embodiment, chassis 200 may be installed in pre-formed opening 109 in instrument panel 120 of motor vehicle 180. In other embodiments, chassis 200 may be installed in other locations of motor vehicle 180 including, but not limited to, other locations in instrument panel 120, the ceiling, or the center console of motor vehicle 180. Generally, chassis 200 may be installed in any location accessible by the driver or passenger of motor vehicle 180.

Chassis 200 may be configured to house one or more electrical components. As used in this description, the term "electrical component" refers to any electrical device or any portion of an electrical device that may be installed in a motor vehicle, including printed circuit boards, integrated circuits, AM, FM, and satellite radio receivers, CD players, multi-CD changers, digital audio players, and cassette tape decks. Alternatively, the term electrical component may refer to a navigation system. Generally, the term electrical component may refer to any electrical device or any portion of an electrical device that may require the use of a chassis. In this preferred embodiment, chassis 200 may house a radio and a CD player.

Preferably, a chassis may be constructed of a material that provides radio frequency electromagnetic radiation shielding (RF shielding) to any electrical component housed within the chassis. Furthermore, a chassis may also prevent any radio frequency electromagnetic radiation emitted by an electrical component housed within the chassis from escaping the chassis. The RF shielding provided by the chassis may reduce the interference or coupling of radio waves, electromagnetic fields and electrostatic fields generated by electrical components within and near a motor vehicle. This preferred arrangement may increase the effectiveness of electrical components by limiting the flow of electromagnetic fields between electrical components in the close confines of a motor vehicle.

In some embodiments, a chassis may be constructed of a thermoplastic polymer embedded or coated with a conductive material. In some cases, acrylonitrile butadiene styrene (ABS) with steel fiber may be used to construct the chassis. In other cases, polycarbonate acrylonitrile butadiene styrene (PCABS) with carbon fiber may be used to construct the chassis. Generally, a chassis may be made of any material that provides RF shielding and shock absorbance. In this preferred embodiment, chassis 200 may be constructed of ABS with steel fiber.

In some embodiments, using a conductive polymer to construct chassis 200 may help with weight reduction. In this preferred embodiment, by using ABS with steel fiber, chassis 200 may weigh 20 percent less than a similar chassis constructed of metal. This weight reduction may allow for increased fuel efficiency of motor vehicle 180.

Preferably, a chassis includes provisions allowing a user to access or manipulate electrical components housed within the chassis. In some embodiments, a front control panel with buttons, displays, knobs or dials may be configured to interface with one or more electrical components housed within a chassis. In other embodiments, a face plate may be used to protect portions of electrical components that are not designed for user access. In some cases, the face plate may serve aesthetic purposes and provide a finished look to the electrical component. In still other embodiments, a face plate may be integrally formed with a front control panel. In a preferred embodiment, a face plate may be fitted over a front control panel to provide functional use and protection of one or more electrical components housed within a chassis.

In this embodiment, chassis 200 may be associated with front control panel 130. Front control panel 130 may be any device configured to communicate with, and provide control of, an electrical component disposed within chassis 200. Furthermore, chassis 200 may be associated with face plate 140. In this preferred embodiment, face plate 140 may be configured to cover one or more portions of front control panel 130.

In some embodiments, a front control panel and a face plate may be secured to a chassis by screws. In other embodiments, a front control panel and a face plate may include tabs and snap onto tab receiving portions of a chassis. In a preferred embodiment, a front control panel and face plate may be attached to a chassis using an interference fit. This preferred arrangement provides a user interface for electrical components housed within a chassis.

In this embodiment, front control panel 130 and face plate 140 configured for a radio may be attached to chassis 200 using an interference fit. Preferably, face plate 140 includes small protrusions 142 that may be configured to engage front portion 144 of chassis 200. In some cases, small protrusions may apply tension between first side 152 and second side 154 of front portion 144. In other cases, small protrusions may include recesses to snap onto screws or other protruding surfaces associated with front portion 144. In other embodiments, small protrusions 142 may be configured to wrap around front control panel 130. In these embodiments, front control panel 130 may be configured to attach directly to chassis 200 by way of an electrical connection with a radio or another electrical component. Using this arrangement, face plate 140 and front control panel 130 may be easily removed and attached to chassis 100 without the need to remove chassis 200 from pre-formed opening 109.

Figure 2:
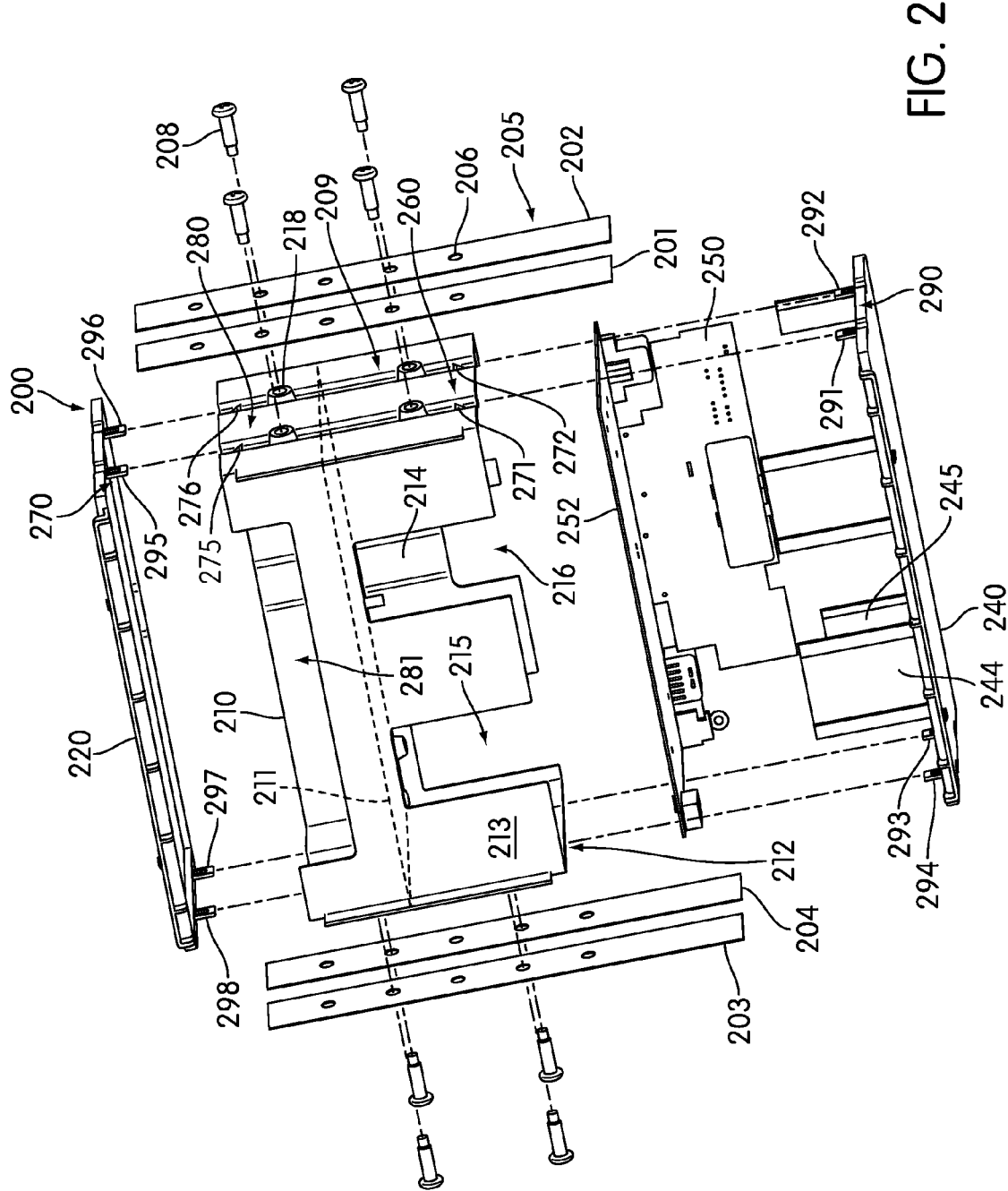
FIG. 2 is an exploded isometric view of a preferred embodiment of a chassis with a set of rack mounts.

FIG. 2 illustrates an exploded view of a preferred embodiment of chassis 200. Referring to FIG. 2, rack 205 may be adapted to mount chassis 200 in a motor vehicle. For clarity, rack 205 is illustrated in isolation in FIG. 2 without a motor vehicle or a component of a motor vehicle. Generally, however, rack 205 may be embedded in an instrument panel, center console or roof of a motor vehicle in any known manner. In this preferred embodiment, rack 205 may be embedded inside a pre-formed opening in an instrument panel of a motor vehicle.

Rack 205 comprises first rack mount 201, second rack mount 202, third rack mount 203, and fourth rack mount 204. Although illustrated as having a particular structure in FIG. 2, rack 205 may comprise any structure or set of elements that allow chassis 200 to be mounted in a motor vehicle. In this preferred embodiment, rack 205 includes holes 206 distributed on rack mounts 201-204 to facilitate the mounting of chassis 200.

Holes 206 are configured to receive screws 208. Generally, screws 208 may be any kind of screw configured to attach chassis 200 to rack 205. In this preferred embodiment, screws 208 may be self-tapping screws or bolts. Using this preferred arrangement, screws 208 may be inserted through holes 206 in rack mounts 201-204 and into chassis 200 to secure chassis 200 to a motor vehicle.

Chassis 200 comprises, among other elements, lower portion 240, central portion 210, and upper portion 220. In some embodiments, screws 208 may be inserted into receiving holes in upper portion 220 and lower portion 240. In other embodiments, screws 208 may be inserted into receiving holes in central portion 210 of chassis 200. In still other embodiments, screws 208 may be inserted into front wall 213 and rear wall 214 of central portion 210. In this preferred embodiment, screws 208 may be inserted into receiving holes 218 in right side wall 209 and left side wall 212 of central portion 210. Using this preferred configuration, chassis 200 may be mounted on rack 205 in a pre-formed opening in an instrument panel of a motor vehicle.

Generally, the structural integrity of central portion 210 is an important consideration in the fabrication of central portion 210. In some embodiments, central portion 210 may be assembled by welding walls 209, 212, 213 and 214 together. In other embodiments, central portion 210 may be fabricated by securing walls 209, 212, 213 and 214 together with permanent fasteners. Generally, central portion 210 may be fabricated by any means that ensure the structural integrity of central portion 210. In this preferred embodiment, walls 209, 212, 213 and 214 of central portion 210 may be integrally formed.

In some embodiments, central portion 210 may include a middle shelf portion. In some cases, the middle shelf portion could be configured to receive one or more components, including electrical components. In other cases, the middle shelf portion could provide additional structural support to central portion 210. In this preferred embodiment, central portion 210 includes middle shelf portion 211 (shown in phantom). Details of middle shelf portion 211 are discussed later in this detailed description and illustrated in FIG. 7.

In some embodiments, portions of a chassis may be customized to a particular make and model of motor vehicle. In some cases, an upper portion may be customizable. In other cases, a lower portion may be customizable. In other embodiments, all portions of a chassis may be generic and fit most models and makes of motor vehicles. In a preferred embodiment, upper portion 220 and lower portion 240 may be customizable and include ridges or valleys or other features that assist in fitting chassis 200 in a particular model or make of a motor vehicle. Furthermore, central portion 210 may be generic and fit most models and makes of motor vehicles.

As previously discussed, chassis 200 may be configured to house one or more electrical components. In this preferred embodiment, electrical component 250 is a printed circuit board that may be housed within chassis 200. Preferably, electrical component 250 includes mounting bracket 252. Using this arrangement, electrical component 250 may be mounted within central portion 210.

As previously discussed, in some embodiments, chassis 200 may be associated with a front control panel and a face plate. In other embodiments, chassis 200 may include other provisions for using and manipulating electrical components housed within chassis 200. In this preferred embodiment, front wall 213 of central portion 210 may include front cut out portions 215. Front cut out portions 215 may be designed generically for any electrical component or specifically for one or more electrical components. Using this arrangement, front cut out portions 215 provide access to one or more electrical components housed within chassis 200.

In some embodiments, central portion 210 may also include upper slot 281. Upper slot 281 may, for example, be associated with the front of a CD player or the front of a cassette player. In this example, upper slot 281 may be used to insert CDs or cassettes through chassis 200 and into a CD player or a cassette player. In other embodiments, upper slot 281 could be associated with a DVD player as well.

Preferably, a chassis includes provisions for connecting electrical components housed within the chassis to other components located elsewhere in a motor vehicle. In some embodiments, electrical components housed within the chassis may be connected to speakers. In other embodiments, electrical components within a chassis may be connected to a power source. In still other embodiments, electrical components within a chassis may be connected to an antenna. Generally, electrical components within a chassis may be connected to any other component within a motor vehicle. In a preferred embodiment, chassis 200 includes provisions to attach electrical components housed within chassis 200 to other components within a motor vehicle.

In this preferred embodiment, rear wall 214 of central portion 210 may include multiple rear cut out portions to facilitate the connection of electrical components housed within chassis 200 to other components within a motor vehicle. In some cases, central portion 210 includes rear cut out portions 216. In this preferred embodiment, rear cut out portions 216 comprise three cut out portions. In other embodiments, more or less cut out portions may be included. In addition, the shape of rear cut out portions 216 may be configured to provide access to specific areas of electrical components housed within chassis 200.

Preferably, lower portion 240 of chassis 200 include provisions for modifying the size of front cut out portions 215 as well as rear cut out portions 216. In some cases, the effectiveness of RF shielding may be reduced by cut out portions in a front wall and rear wall of a central portion of a chassis. While cut out portions are necessary to provide user access to electrical components within a chassis and access to other electrical components within a motor vehicle, cut out portions may be larger than needed for some electrical components. Provisions for reducing the space of cut out portions in a central portion of a chassis may be useful in boosting the effectiveness of the RF shielding of the chassis.

In some embodiments, lower portion 240 may include front covering members 244 that are configured to associate with front cut out portions 215. Additionally, lower portion 240 may include rear covering members 245 that are configured to associate with rear cut out portions 216. In a preferred embodiment, covering members 244 and 245 may be integrally formed with lower portion 240. This preferred arrangement allows central portion 210 to be used with multiple vehicles while still meeting the connection requirements of specific electrical components housed within chassis 200 through front cut out portions 215 and rear cut out portions 216.

Preferably, a chassis including several separate portions includes provisions for quick and easy assembly of these portions. In some cases, as previously discussed, the chassis may include a standard central portion that is adapted to associate with any type of motor vehicle console. Additionally, the chassis may include upper and low portions that are configured for specific vehicle console arrangements. Preferably, the chassis includes provisions for easily assembling the upper and lower portions with the central portion.

Generally, the upper portion and the lower portion may be associated with the central portion using any known provisions for connecting portions of a chassis. In some embodiments, screws may be used to attach the upper portion and the lower portion to the central portion. In other embodiments, tabs of some kind may be used. In a preferred embodiment, tabs and tab receiving portions may be used to attach the upper portion and the lower portion to the central portion.

Referring to FIG. 2, central portion 210 preferably includes first tab 271 and second tab 272 disposed on right side wall 209. Also, central portion 210 preferably includes third tab 273 and fourth tab 274 disposed on left side wall 212 (see FIG. 6). For clarity, tabs 271-274 may be collectively referred to as lower tab set 260. Additionally, central portion 210 may include fifth tab 275 and sixth tab 276 disposed on right side wall 209. Also, central portion 210 preferably includes seventh tab 277 and eighth tab 278 disposed on left side wall 212 (see FIG. 6). For clarity, tabs 275-278 may be collectively referred to as upper tab set 280.

Lower portion 240 and upper portion 220 may include provisions for associating with lower tab set 260 and upper tab set 280 of central portion 210. In this preferred embodiment, lower portion 240 includes first tab receiving portion 291, second tab receiving portion 292, third tab receiving portion 293, and fourth tab receiving portion 294. For clarity, tab receiving portions 291-294 may be collectively referred to as lower tab receiving set 290. Similarly, upper portion 220 may include fifth tab receiving portion 295, sixth tab receiving portion 296, seventh tab receiving portion 297 and eighth tab receiving portion 298. For clarity, tab receiving portions 295-298 may be collectively referred to as upper tab receiving set 270.

Preferably, lower tab set 260 and lower tab receiving set 290 are configured to snap together and secure central portion 210 to lower portion 240 by applying pressure in a substantially perpendicular direction to lower portion 240. Similarly, upper tab set 280 and upper tab receiving set 270 are configured to snap together and secure central portion 210 to upper portion 220 by applying pressure in a substantially perpendicular direction to upper portion 220. Using this arrangement, chassis 200 may be constructed by snapping tab receiving sets 290 and 270 of lower portion 240 and upper portion 220, respectively, to tab sets 260 and 280 of central portion 210. An embodiment of chassis 200 assembled in this manner may be clearly seen in FIGS. 5 and 6.

In this embodiment, tab receiving sets 270 and 290 comprise four tab receiving portions each that fit into tab sets 280 and 260, respectively. In some embodiments, tab receiving sets 270 and 290 and tab sets 280 and 260 may comprise of more or less tab receiving portions and tabs, respectively. Furthermore, in this embodiment, tab sets 280 and 260 are disposed near the corners of right side wall 209 and left side wall 212 with tab receiving sets 270 and 290 mounted in corresponding locations on upper portion 220 and lower portion 240, respectively. In other embodiments, tab sets 280 and 260 and tab receiving sets 270 and 290 may be disposed in a different location on chassis 200. Generally, tab sets 280 and 260 and tab receiving sets 270 and 290 may be disposed in any location to securely assemble portions 220, 240 and 210 of chassis 200.

Figure 3:
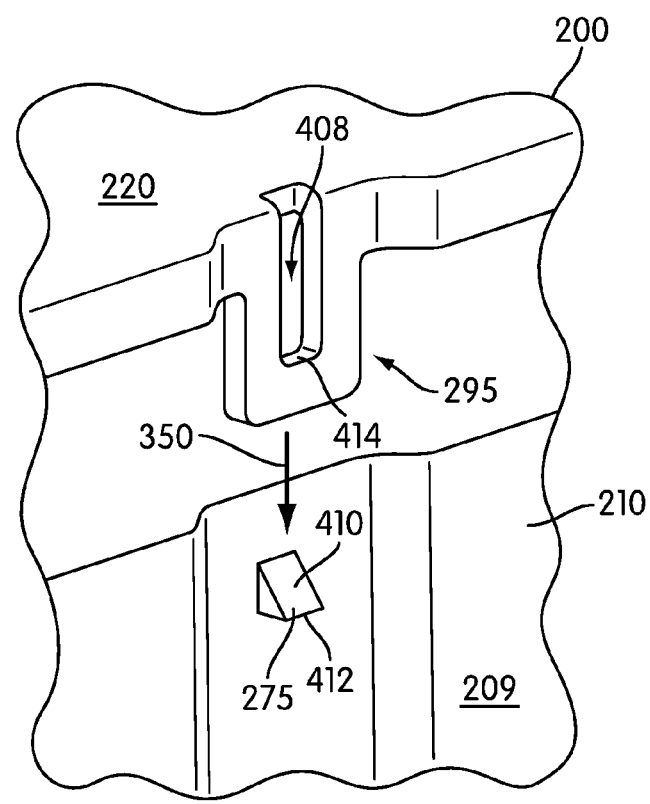
FIG. 3 is a schematic view of a preferred embodiment of a tab and a tab receiving portion.
Figure 4:
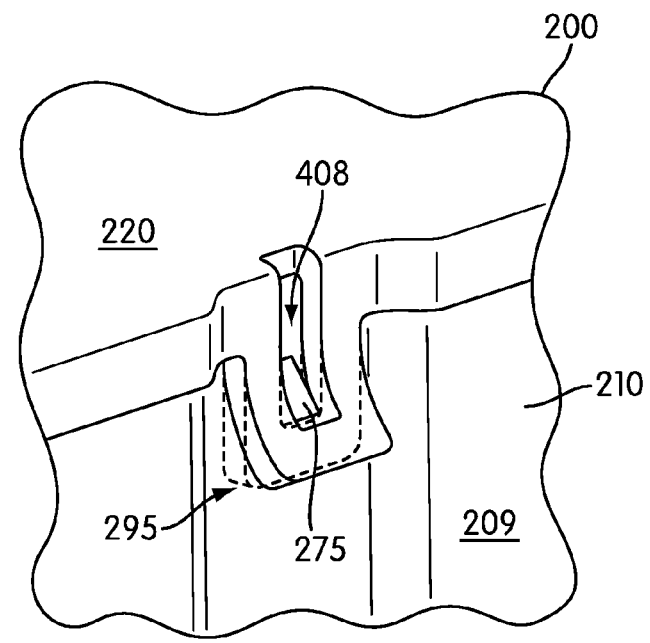
FIG. 4 is a schematic view of a preferred embodiment of a tab and a tab receiving portion snapped together.

FIGS. 3-4 illustrate a preferred embodiment of the connection of fifth tab 275 with fifth tab receiving portion 295. For purposes of clarity, only a portion of central portion 210 and upper portion 220 are shown. As previously discussed, fifth tab 275 may be disposed on right side wall 209 of central portion 210 of chassis 200. Also, fifth tab receiving portion 295 may be disposed on upper portion 220.

Preferably, fifth tab receiving portion 295 may extend away from upper portion 220 towards central portion 210. In some cases, fifth tab receiving portion 295 may include central cut out portion 408 that is configured to receive fifth tab 275. Preferably, fifth tab receiving portion 295 is substantially flexible, as tab receiving portion 295 may be made of a conductive plastic like upper portion 220.

Referring to FIG. 3, fifth tab 275 and fifth tab receiving portion 295 are spaced apart as upper portion 220 is maneuvered into position above central portion 210 of chassis 200. In FIG. 4, a force may be applied to upper portion 220 or central portion 210 to push fifth tab receiving portion 295 over fifth tab 275. Preferably, this force may be applied in a direction perpendicular to upper portion 220 and lower portion 240 (see FIG. 2), indicated at arrow 350. As fifth tab receiving portion 295 is pushed over fifth tab 275, fifth tab receiving portion 295 may bend. At this point, fifth tab 275 is snapped into central cut out portion 408 of fifth tab receiving portion 295. This configuration allows fifth tab receiving portion 295 to be substantially deflected and slide over fifth tab 275, thereby snapping fifth tab 275 into central cut out portion 408 when a force is applied.

In some cases, fifth tab 275 may include a ramp-like shape to facilitate this snap together arrangement. In particular, fifth tab 275 may include ramped portion 410 that facilitates engagement with fifth tab receiving portion 295. Additionally, fifth tab 275 may include flat bottom portion 412 that is configured to contact inner lower surface 414 of fifth tab receiving portion 295. Using this arrangement, as a force is applied to pull upper portion 220 away from central portion 210, fifth tab 275 may prevent fifth tab receiving portion 295 from being easily released.

Although FIGS. 3-4 illustrate the snapping together of fifth tab 275 and fifth tab receiving portion 295, the remaining pairs of tabs and tab receiving portions associated with upper tab set 280 and upper tab receiving set 270 may also be snapped together in the manner illustrated in FIGS. 3-4 to secure central portion 210 to upper portion 220 (see FIG. 2). Furthermore, lower tab set 260 and lower tab receiving set 290 may also comprise four pairs of tabs and tab receiving portions that may also be snapped together in the manner illustrated in FIGS. 3-4 to secure central portion 210 to lower portion 240. This configuration allows chassis 200 to be constructed by snapping tab receiving sets 290 and 270 of lower portion 240 and upper portion 220, respectively, to tab sets 260 and 280 of central portion 210 (see FIG. 2).

In some embodiments, additional features may be included in tabs and tab receiving portions to provide increased stability to the fit of a tab and a tab receiving portion. In some cases, a locking member on the base of a tab may be inserted into a space between receiver members of a tab receiving portion to provide additional force in keeping a tab and a tab receiving portion together. Generally, any provision that increases the locking ability of a tab and a tab receiving portion may be employed.

Figure 5:
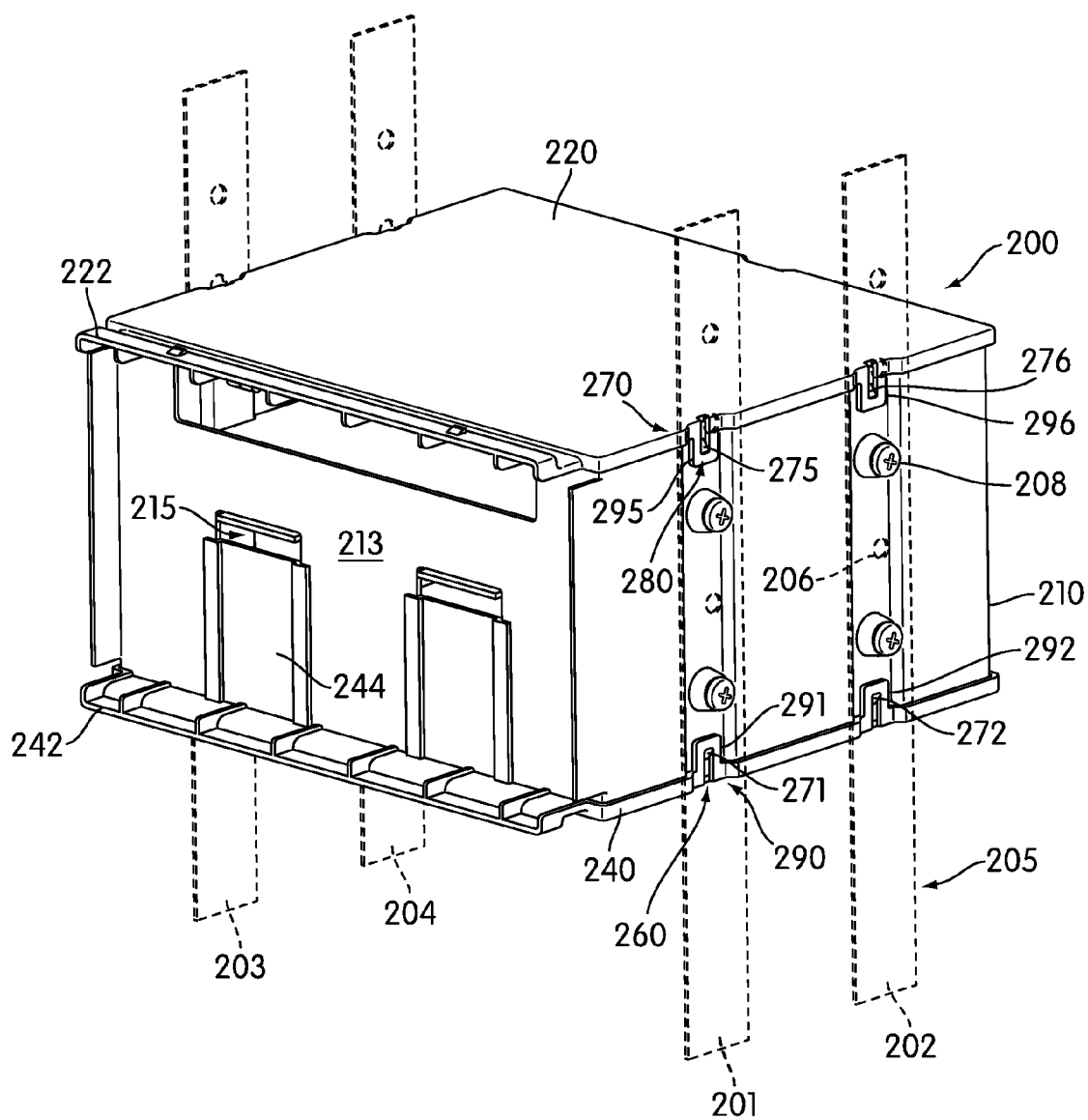
FIG. 5 is a front isometric view of a preferred embodiment of a front of an assembled chassis.
Figure 6:
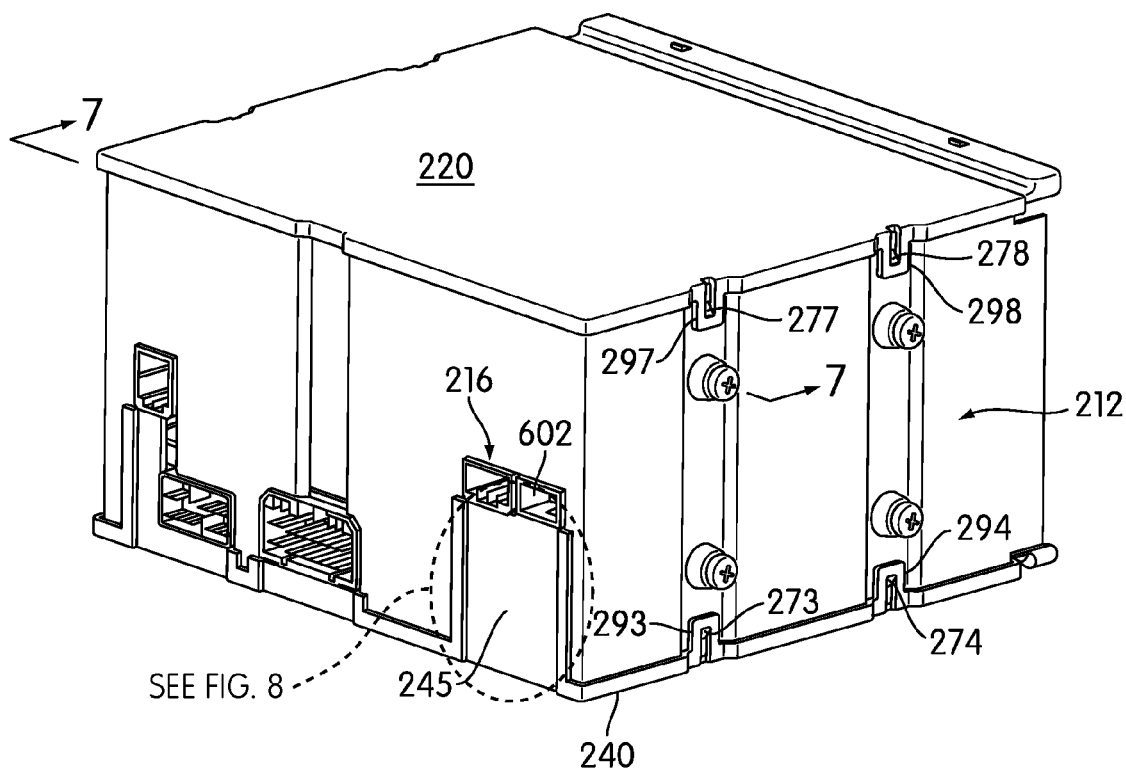
FIG. 6 is a rear isometric view of a preferred embodiment of a rear of an assembled chassis.

FIGS. 5 and 6 illustrate assembled views of a preferred embodiment of chassis 200. Preferably, upper portion 220 and lower portion 240 have been assembled with central portion 210 by connecting tab sets 260 and 280 with tab receiving sets 270 and 290, respectively. Furthermore, in this preferred embodiment, front covering members 244 have been inserted into front cut out portions 215 in order to provide some additional RF shielding. Additionally, rear covering members 245 have also been inserted into rear cut out portions 216. With this arrangement, covering members 244 and 245 facilitate RF shielding to electrical components housed within chassis 200 by limiting the size and shape of cut out portions 215 and 216 to what is necessary for access for connections to other devices.

In some embodiments, covering members may not only cover cut out portions but also overlap the edges of the cut out portions. By overlapping onto a central portion, covering members increase the structural strength as well as the RF shielding of the chassis by eliminating potential gaps where the covering members meet the central portion.

Figure 8:
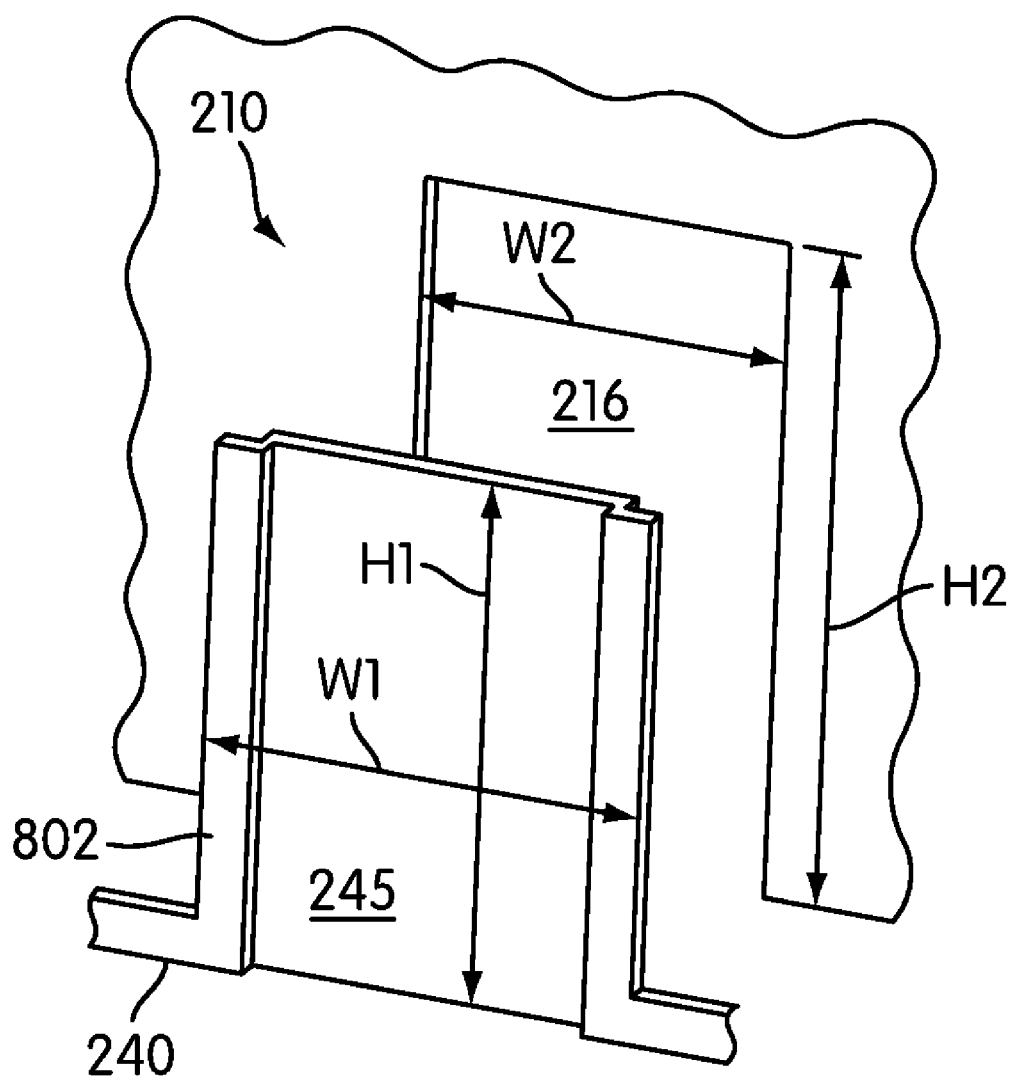
FIG. 8 is an exploded view of a preferred embodiment of a cut out portion and a covering member of a chassis.

FIG. 8 illustrates an exploded view of rear covering member 245 and rear cut out portion 216. In this embodiment, rear covering member 245 partially covers rear cut out portion 216 when lower portion 240 is snapped onto central portion 210. In particular, rear covering member 245 is configured to have height H1 and width W1. Likewise, rear cut out portion 216 is configured to have height H2 and width W2. In this preferred embodiment, height H1 is less than height H2. This difference in heights H1 and H2 exposes part of rear cut out portion 216 when lower portion 240 is snapped onto central portion 210. As previously discussed, this preferred configuration allows an electrical component housed within the chassis access for connections to other devices.

To eliminate any potential gaps when rear covering member 245 covers rear cut out portion 216, width W1 of rear covering member 245 is greater than width W2 of rear cut out portion 216. The greater width W1 of rear covering member 245 covers rear cut out portion 216 and overlaps onto the walls of central portion 210. In particular, overlapping regions 802 of rear covering member 245 overlap onto central portion 210. Overlapping regions 802 are made of the same material as the chassis, preferably a conductive plastic material. Using this arrangement, overlapping regions 802 of rear covering member 245 prevent any gaps between rear covering member 245 and central portion 210 to increase the structural integrity and RF shielding of the chassis.

Although only one cut out portion and covering member are illustrated in FIG. 8, all covering members on a chassis may include similar overlapping regions. In other words, all covering members on a chassis may overlap their respective cut out portions with overlapping regions. This configuration allows overlapping regions to provide additional RF shielding at the boundary between the central portion and covering members of a chassis.

Referring to FIG. 6, one or more portions of an electrical component, such as a printed circuit board, may be exposed through rear cut out portions 216. In particular, in this embodiment, one or more ports associated with the electrical component may be disposed through rear cut out portions 216. Preferably, rear cut out portions 216 provides access to electrical ports 602. Generally, electrical ports 602 may be any type of type of ports configured to connect the electrical component with one or more other electrical devices. For example, electrical ports 602 could include ports configured to receive a power cord, an antenna wire as well as any type of speaker cables. The types of electrical ports discussed here are only intended to be exemplary. In other embodiments, electrical ports 602 may provide access to other devices as well.

In some embodiments, a chassis may include additional structural elements to increase RF shielding and rigidity. In some embodiments, an upper portion of a chassis may include a region that extends beyond the front wall of the central portion of a chassis. In other embodiments, a lower portion of a chassis may include a region that extends beyond the front wall of the central portion of a chassis. In a preferred embodiment, an upper and lower portion of a chassis may extend beyond a front wall to enhance the rigidity and RF shielding of a chassis.

Referring to FIG. 5, upper portion 220 and lower portion 240 of chassis 200 include upper lip 222 and lower lip 242, respectively. Upper lip 222 and lower lip 242 extend beyond front wall 213 of central portion 210 of chassis 200. Preferably, lips 222 and 242 curl around to interact with the edges of a pre-formed opening of an instrument panel of a motor vehicle. This configuration allows lips 222 and 242 to provide additional support at the boundary between chassis 200 and a pre-formed opening of an instrument panel.

As previously discussed, electrical component 250 may be mounted within chassis 200 (see FIG. 2). In some embodiments, electrical component 250 may be mounted to lower portion 240. In other embodiments, electrical component 250 may be mounted to upper portion 220. In a preferred embodiment, electrical component 250 may be mounted to central portion 210.

Generally, electrical component 250 may be mounted to any portion of central portion 210. In some cases, electrical component 250 may be mounted to a side wall of central portion 210. In a preferred embodiment, electrical component 250 may be mounted to a middle shelf portion disposed within central portion 210.

Figure 7:
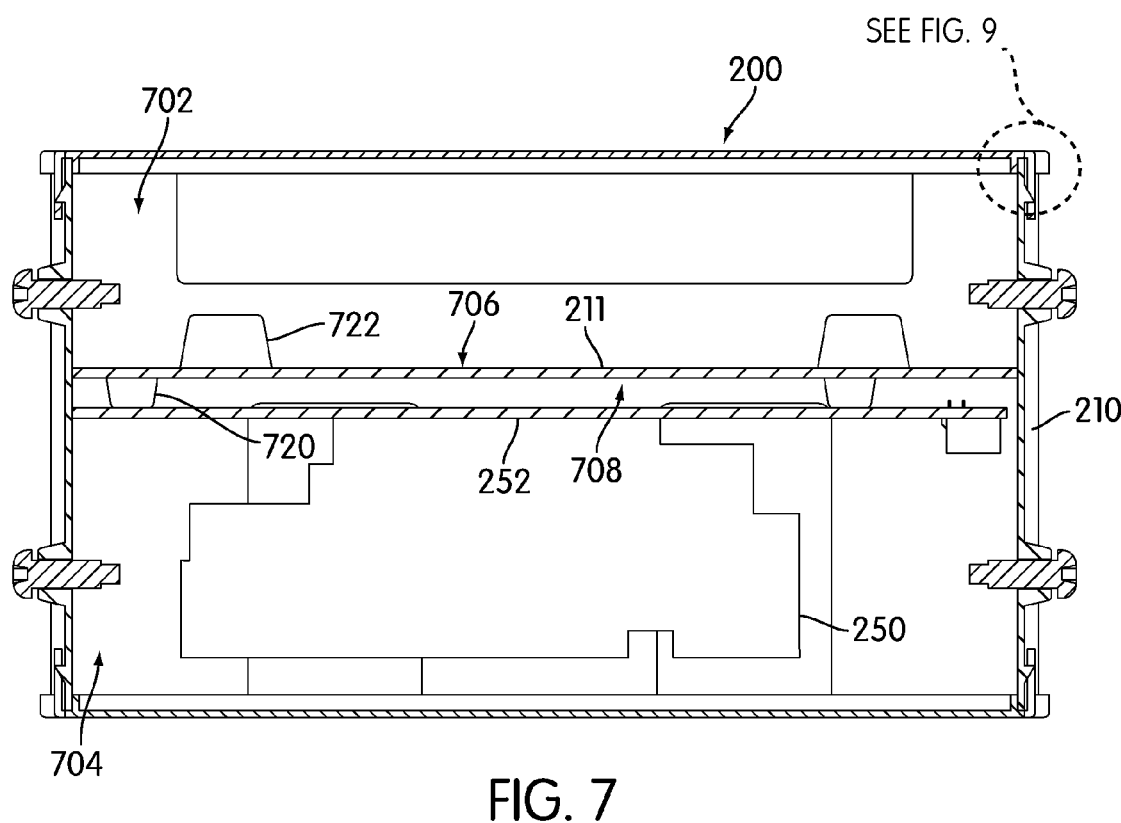
FIG. 7 is a schematic interior view of a preferred embodiment of an assembled chassis.

Referring to FIG. 7, central portion 210 may include middle shelf portion 211, as previously discussed. Preferably, middle shelf portion 211 may be configured to divide central portion 210 into upper interior portion 702 and lower interior portion 704. Middle shelf portion 211 may include upper surface 706 that is associated with upper interior portion 702 and lower surface 708 that is associated with lower interior portion 704.

In some embodiments, middle shelf portion 211 may be integrally formed with central portion 210. In particular, middle shelf portion 211 may be made of a conductive plastic material. With this arrangement, middle shelf portion 211 may provide additional RF shielding to electrical components disposed within chassis 200.

In this embodiment, mounting bracket 252 is configured to attach to lower surface 708 of middle shelf portion 211. In some embodiments, a mounting bracket may be mounted to a shelf by mounting screws. In other embodiments, a mounting bracket may be attached to a shelf by rails and clip nuts. In still other embodiments, a mounting bracket may be attached to a shelf by quick release rack mount fasteners. Generally, any combination of components that securely fastens a mounting bracket or some portion of an electrical component to a shelf may be used. In a preferred embodiment, mounting screws may be used to mount a mounting bracket to a middle shelf of a chassis.

In this embodiment, mounting bracket 252 may be attached to lower mounting regions 720 using mounting screws. The structure of lower mounting regions 720 preferably provides for some shock absorbance. In some cases, the extension of mounting regions 720 away from middle shelf portion 211 may help reduce overheating of any processors or other devices that may be mounted directly to mounting bracket 252.

Although this embodiment includes only one electrical component, in other embodiments, chassis 200 may include additional electrical components as well. In other embodiments, for example, an additional electrical component may be mounted on upper surface 706 of middle shelf portion 211. For example, a CD player may be mounted on upper surface 706 of middle shelf portion 211 with the use of mounting screws attached to upper mounting regions 722. Using this arrangement, multiple electrical components may be mounted on middle shelf portion 211 and housed within chassis 200.

As seen in FIG. 7, electrical component 250 may be enclosed within lower interior portion 704. This arrangement allows electrical component 250 to be shielded from incoming radio frequency electromagnetic radiation. Furthermore, any electrical component disposed within upper interior portion 702, such as a CD player or other electrical device, may also be shielded from incoming radio frequency electromagnetic radiation. Additionally, electrical components disposed within portions 702 and 704 may also be prevented from interfering with one another, in cases where middle shelf portion 211 is also made of a conductive plastic material.

In some embodiments, the boundaries between a central portion and upper and lower portions of a chassis may also benefit from provisions to increase the structural integrity and the RF shielding of the chassis. As discussed previously, a chassis may be assembled by snapping the upper and lower portions onto the central portion. To prevent gaps where the upper and lower portions are snapped onto the central portion, the central portion may be fitted into channels configured in both the upper and lower portions of the chassis.

Figure 9:
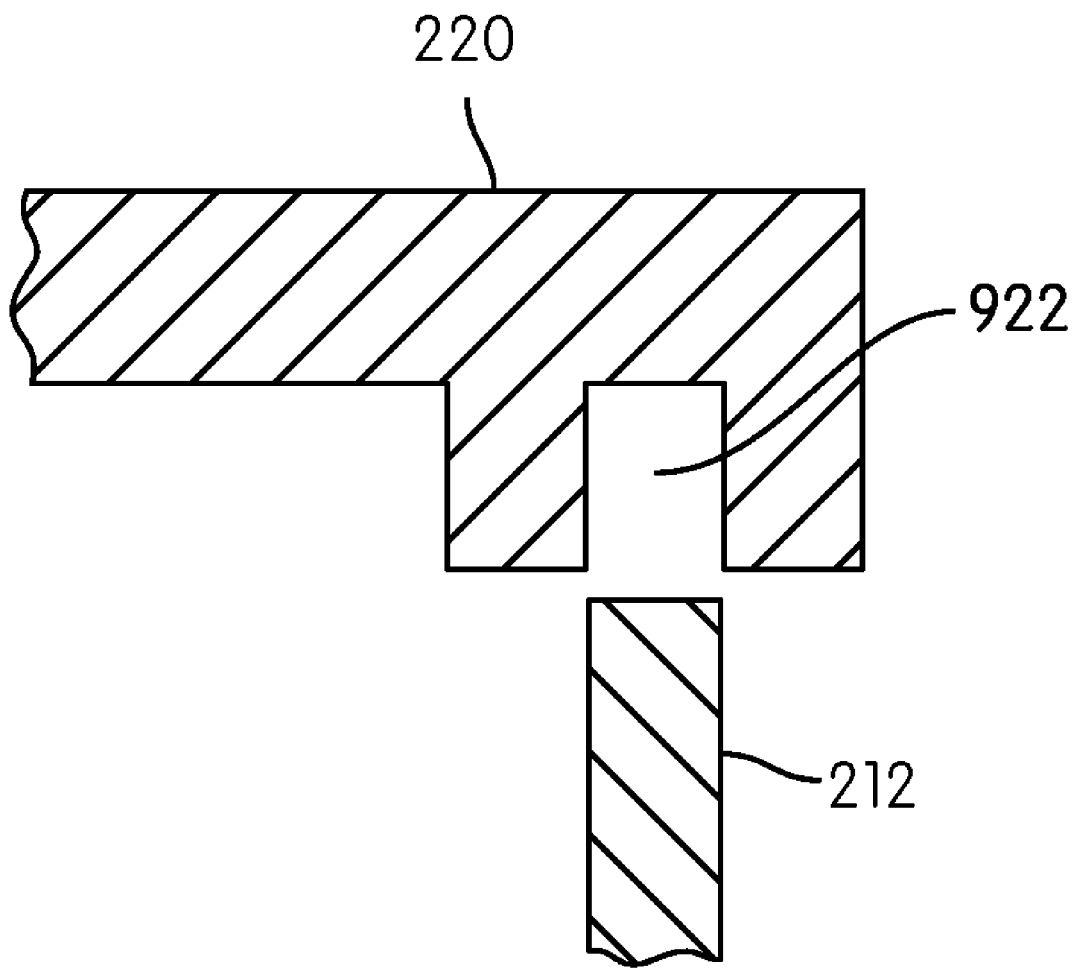
FIG. 9 is an exploded cross sectional view of a preferred embodiment of a fragment of a central portion and upper portion of a chassis.

FIG. 9 illustrates an exploded cross section of a preferred embodiment of a portion of side wall 212 and upper portion 220. When snapping upper portion 220 onto side wall 212 of a central portion, side wall 212 may be fitted into channel 922. Channel 922 preferably holds side wall 212 securely and eliminates any openings or gaps at the boundary between side wall 212 and upper portion 220. By preventing gaps at this boundary, the structural integrity and RF shielding capabilities of the chassis may be improved.

Although only a fragment of upper portion 220 and channel 922 is illustrated in FIG. 9, it may be assumed that channel 922 extends over all edges of upper portion 220. Furthermore, front, rear and side walls of the central portion may be fitted into channel 922 when upper portion 920 is snapped onto the central portion. Additionally, the edges of the lower portion may also be configured with a channel to securely hold the central portion and eliminate any gaps or openings that may compromise the structural integrity and RF shielding of the chassis. In other words, the central portion may be fitted into channels in the upper and lower portions when the portions are snapped together. Using this arrangement, gaps at these boundaries may be prevented in order to increase the structural strength and RF shielding of the chassis.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A chassis for an electrical component configured to be installed in a motor vehicle, comprising:
    an integral central portion having vertical side walls, wherein the vertical side walls have upper edges defining an upper opening on a first side of the vertical side walls and lower edges defining a lower opening on a second side of the vertical side walls opposite to the first side;
    a horizontal upper portion disposed across the upper opening of the central portion at the first side of the vertical side walls and a horizontal lower portion disposed across the lower opening of the central portion at the second side of the vertical side walls;
    the upper portion being associated with the vertical side walls of the central portion by the use of a first tab and a first tab receiving portion;
    the lower portion being associated with the vertical side walls of the central portion by the use of a second tab and a second tab receiving portion; and
    wherein the first tab receiving portion is substantially flexible and deflects when engaging the first tab and wherein the second tab receiving portion is substantially flexible and deflects when engaging the second tab.

2. The chassis according to claim 1, wherein the central portion includes a middle shelf portion that is integrally formed with side walls of the central portion and extends horizontally between the vertical side walls at a location vertically between the upper edges and the lower edges.

3. The chassis according to claim 1, wherein the first tab associates with the first tab receiving portion in a direction perpendicular to the upper portion.

4. The chassis according to claim 1, wherein the second tab associates with the second tab receiving portion in a direction perpendicular to the lower portion.

5. The chassis according to claim 1, wherein the central portion, the upper portion and the lower portion are made of a conductive plastic, wherein the horizontal upper portion defines an upper channel protruding perpendicularly from the horizontal upper portion, wherein the horizontal lower portion defines a lower channel protruding perpendicularly from the horizontal lower portion, wherein the upper edges are disposed vertically inside the upper channel, and wherein the lower edges are disposed vertically inside the lower channel.

6. The chassis according to claim 1, wherein the upper portion includes four tab receiving portions.

7. The chassis according to claim 1, wherein the lower portion includes four tab receiving portions.

8. The chassis according to claim 1, wherein the vertical side walls comprise a first vertical side wall, a second vertical side wall transverse to the first vertical side wall, a third vertical side wall opposite to the first vertical side wall and transverse to the second vertical side wall, and a fourth side wall opposite to the second side wall and transverse to the third side wall and the first side wall;
    wherein the central portion includes eight tabs;
    wherein a first tab and a second tab of the eight tabs are disposed proximate to the upper edge of the first vertical side wall;
    wherein a third tab and a fourth tab of the eight tabs are disposed proximate to the upper edge of the third vertical side wall;
    wherein a fifth tab and a sixth tab of the eight tabs are disposed proximate to the lower edge of the first vertical side wall; and wherein a seventh tab and an eighth tab of the eight tabs are disposed proximate to the lower edge of the third vertical side wall.

9. A chassis for an electrical component configured to be installed in a motor vehicle, comprising:
   a central portion, a lower portion and an upper portion;
   the central portion, the lower portion and the upper portions being made of a conductive plastic;
   wherein the central portion comprises a plurality of vertical side walls enclosing an interior volume, wherein upper edges of the vertical side walls define a horizontally extending upper opening on a first side of the vertical side walls, and wherein lower edges of the vertical side walls define a horizontally extending lower opening on a second side of the vertical side walls opposite to the first side;
   wherein the upper portion extends horizontally across the upper opening at the first side of the vertical side walls and the lower portion extends horizontally across the lower opening at the second side of the vertical side walls;
   wherein the upper portion and the lower portion are attached to the central portion by pressing the upper portion and the lower portion against the central portion in a direction substantially perpendicular to the upper portion and the lower portion;
   wherein the central portion includes one of a first tab and a first tab receiving portion and the upper portion includes the other of the first tab and the first tab receiving portion and wherein the central portion includes one of a second tab and a second tab receiving portion and the lower portion includes the other of the second tab and the second tab receiving portion; and
   wherein the first tab receiving portion is substantially flexible and deflects when engaging the first tab and wherein the second tab receiving portion is substantially flexible and deflects when engaging the second tab.

10. The chassis according to claim 9, wherein the central portion includes a middle shelf portion that extends between and perpendicular to the vertical side walls, and is integrally formed with the vertical side walls.

11. The chassis according to claim 9, wherein the conductive plastic provides flexibility for the first tab and the first tab receiving portion and for the second tab and the second tab receiving portion.

12. The chassis according to claim 9, wherein the upper portion defines an upper channel protruding perpendicularly from the upper portion, wherein the lower portion defines a lower channel protruding perpendicularly from the lower portion, wherein the upper edges are disposed vertically inside the upper channel, and wherein the lower edges are disposed vertically inside the lower channel, and wherein the conductive plastic provides RF shielding for the electrical component.

13. The chassis according to claim 9, wherein the chassis is configured to receive a printed circuit board.

14. The chassis according to claim 9, wherein the chassis is configured to receive an audio component.

15. The chassis according to claim 9, wherein the chassis is configured to receive a navigation system.

16. The chassis according to claim 9, wherein a vertical side wall of the central portion includes at least one cut out portion configured to receive a portion of an electrical component.

17. The chassis according to claim 16, wherein the lower portion includes at least one vertical covering member that extends perpendicularly from the lower portion and covers a portion of the cut out portion.

18. The chassis according to claim 17, wherein a first width of the covering member is larger than a second width of the cut out portion, wherein the first width and the second width both extend in a horizontal direction, wherein a first height of the covering member is less than a second height of the cut out portion, and wherein the first height and the second height both extend in a vertical direction.

19. The chassis according to claim 9, wherein the lower portion includes a channel protruding perpendicularly from the lower portion and configured to receive the lower edges of the central portion and wherein the channel is configured to prevent gaps between the lower portion and the lower edges of the central portion.

20. The chassis according to claim 9, wherein the upper portion includes a channel protruding perpendicularly from the upper portion and configured to receive the upper edges of the central portion and wherein the channel is configured to prevent gaps between the upper portion and the upper edges of the central portion.

21. A method of assembling a chassis for an electrical component configured to be installed in a motor vehicle, comprising the steps of:
   associating a central portion of the chassis with an upper portion of the chassis, the central portion comprising a plurality of side walls enclosing an interior volume configured to receive an electrical component, the side walls having upper edges defining an upper opening on a first side of the side walls and lower edges defining a lower opening on a second side of the side walls opposite to the first side;
   covering the upper opening of the central portion with the upper portion of the chassis, the upper portion extending perpendicularly to the side walls at the first side of the side walls; covering the lower opening of the central portion with a lower portion of the chassis, the lower portion extending perpendicularly to the side walls at the second side of the side walls; pressing a first tab receiving portion of one of the upper portion and the central portion over a first tab of the other of the upper portion and the central portion; pressing a second tab receiving portion of one of the lower portion and the central portion over a second tab of the other of the lower portion and the central portion; and thereby connecting the upper portion and the lower portion to the central portion.

22. The method according to claim 21, wherein the first tab receiving portion is substantially flexible.

23. The method according to claim 22, comprising the step of deflecting the substantially flexible first tab receiving portion to engage the first tab.

24. The method according to claim 21, wherein the central portion includes a middle shelf portion extending between and perpendicular to the side walls, and wherein the method further comprises integrally forming the side walls and the middle shelf portion of the central portion.

25. The method according to claim 24, comprising the step of attaching an electrical component to the middle shelf portion of the central portion.

* * * * *